Figure 11:
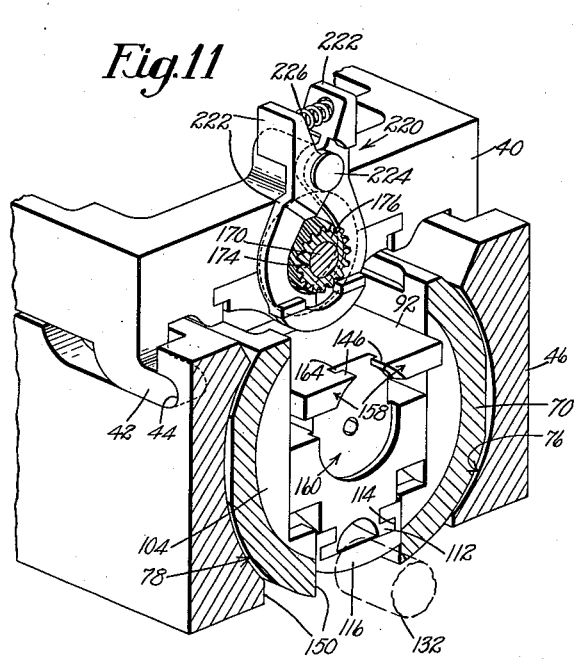

May 9, 1961  P. H. DIXON  2,983,196
FEEDING MECHANISM FOR GAS PISTON OPERATED GUN
Filed July 30, 1947  7 Sheets-Sheet 1

*Fig.2*

*Fig.1*

*Inventor*
Paul H. Dixon
By his Attorney
Thomas J. Ryan

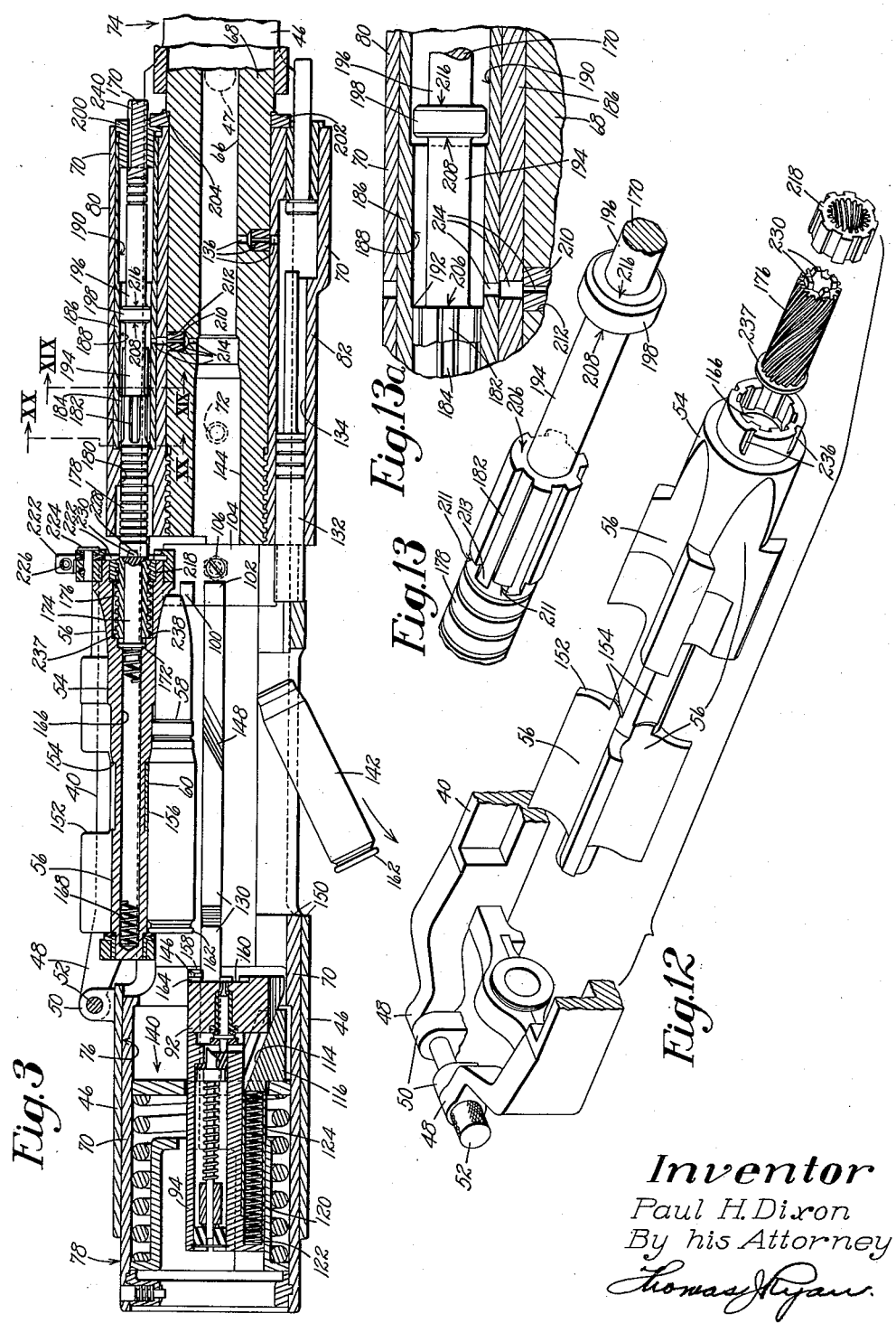

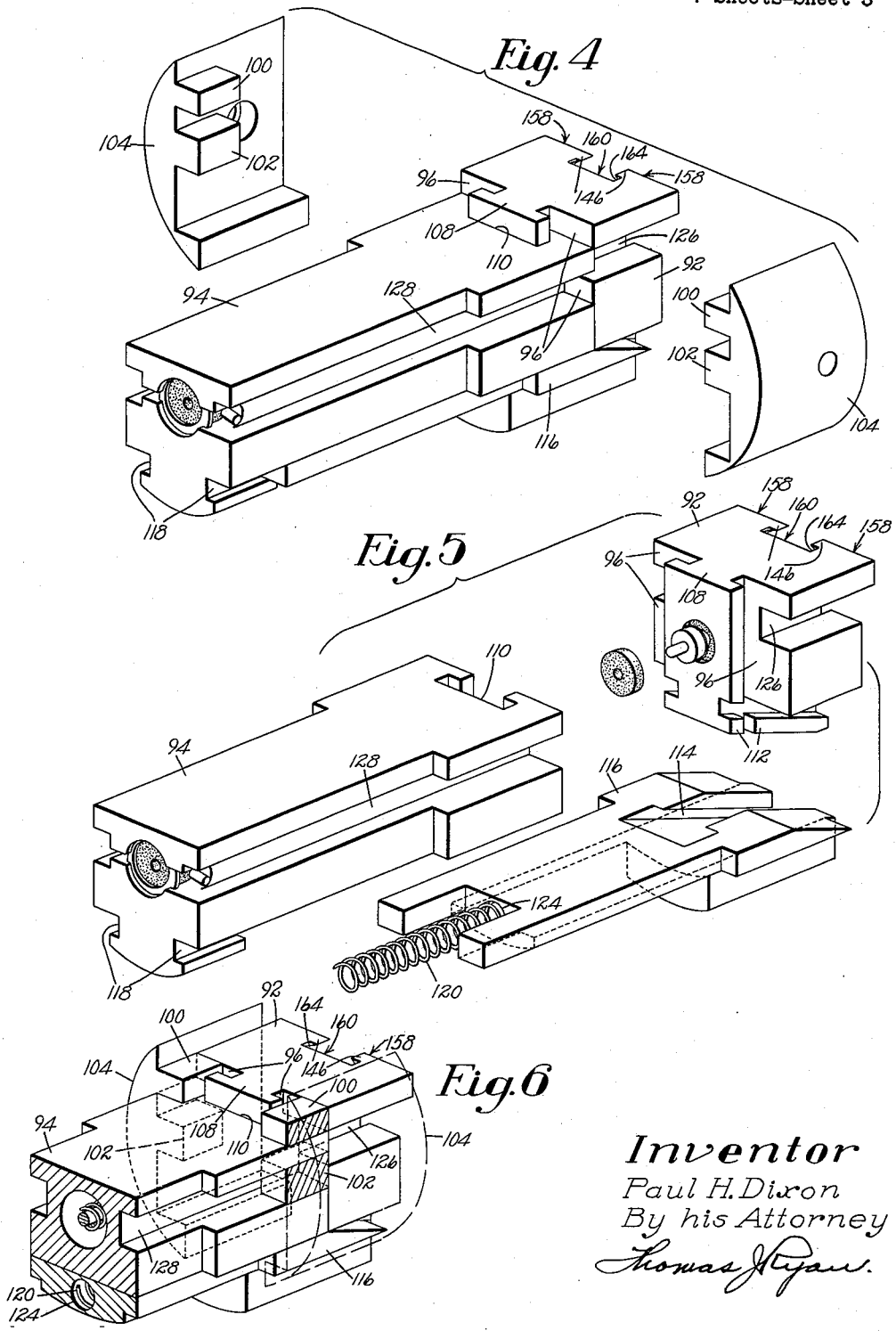

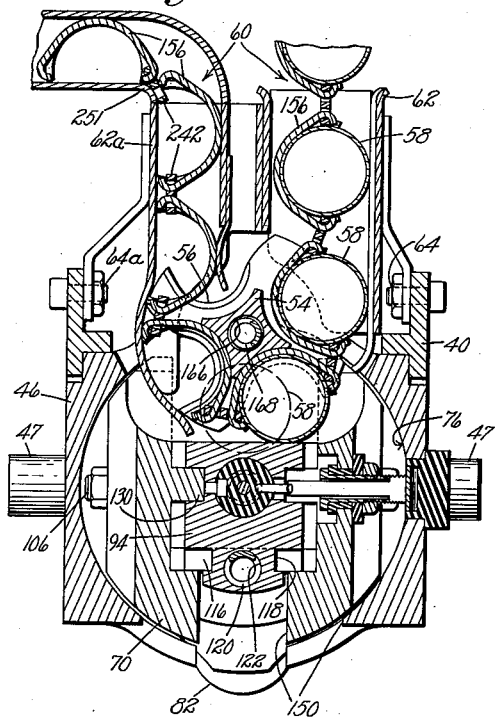
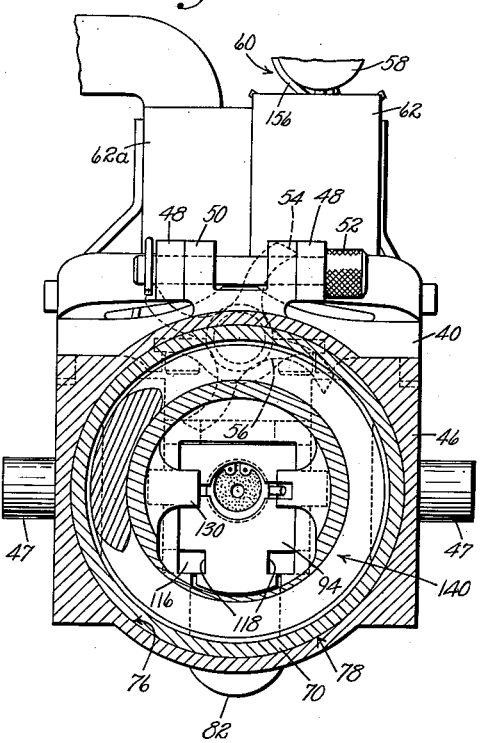
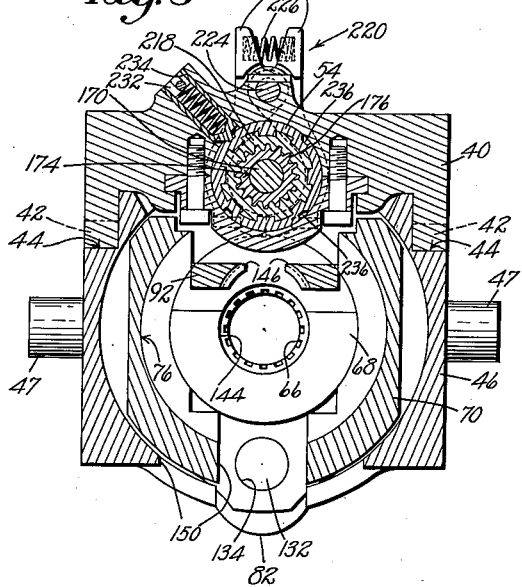

May 9, 1961  P. H. DIXON  2,983,196
FEEDING MECHANISM FOR GAS PISTON OPERATED GUN
Filed July 30, 1947  7 Sheets-Sheet 5

Inventor
Paul H. Dixon
By his Attorney
Thomas J. Ryan.

May 9, 1961  P. H. DIXON  2,983,196
FEEDING MECHANISM FOR GAS PISTON OPERATED GUN
Filed July 30, 1947  7 Sheets-Sheet 6
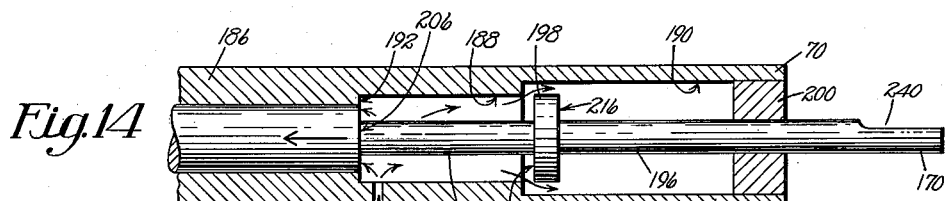
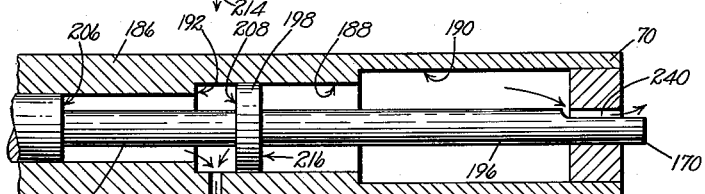
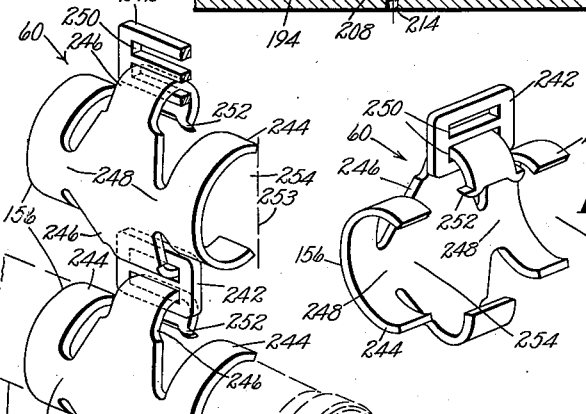
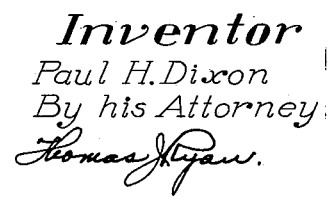
*Inventor*
Paul H. Dixon
By his Attorney
Thomas J. Ryan

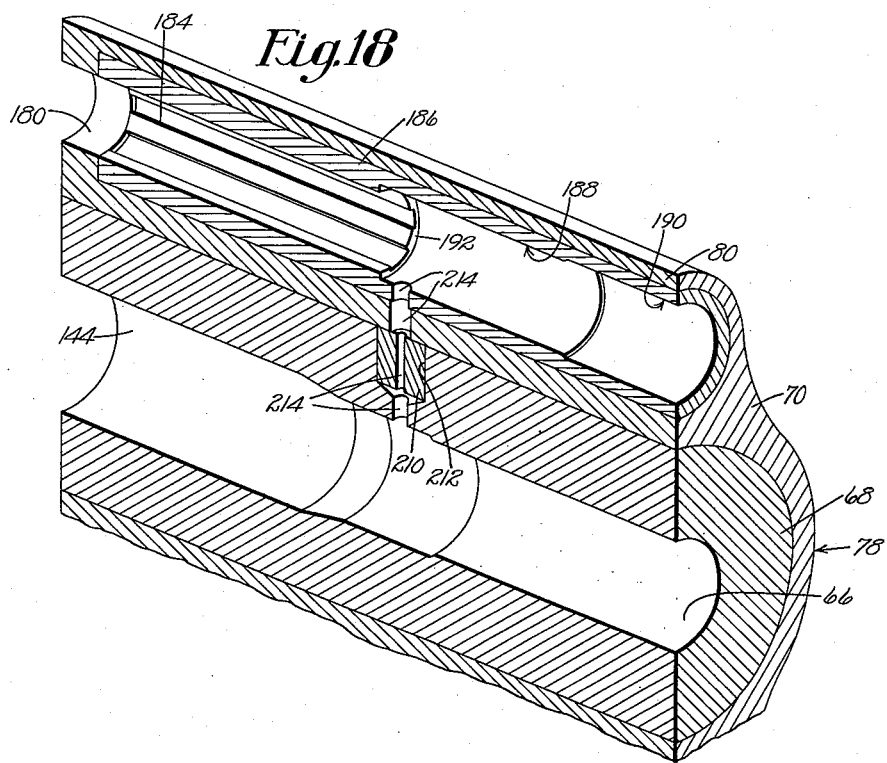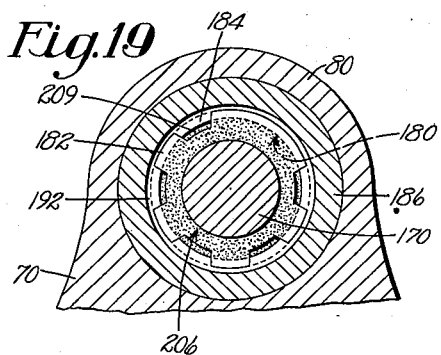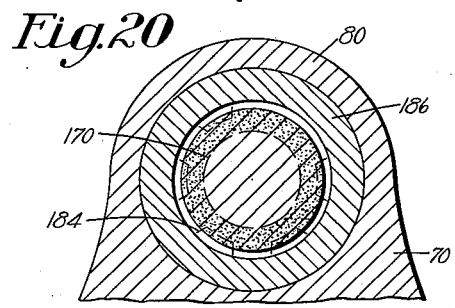

United States Patent Office 2,983,196
Patented May 9, 1961

2,983,196

FEEDING MECHANISM FOR GAS PISTON OPERATED GUN

Paul H. Dixon, Rockford, Ill., assignor to United Shoe Machinery Corporation, Flemington, N.J., a corporation of New Jersey Filed July 30, 1947, Ser. No. 764,790

7 Claims. (Cl. 89—33)

This invention relates to ordnance and is illustrated as embodied in a 20 mm. gun or cannon.

It is highly desirable to increase the cyclic rate of guns or cannon used in airplanes since an enemy aircraft is in a gunner's sights for only a few seconds at a time during which it is desirable to fire as many rounds as possible.

One difficulty in effecting a high rate of fire has been the inability to feed cartridges quickly and effectively to the gun, it being apparent that feed mechanism used for this purpose has to be quick and effective in its operation and must be actuated in timed relation with recoiling parts of the gun.

Various types of ammunition feeders have been proposed but most of such feeders have been found to be objectionable because of the auxiliary mechanism required and accordingly the additional weight added to the gun and/or because they rely upon spring action which is not effective in the moving of heavy masses in proper timed relation intermittently at very high speeds such as is required in guns having a high cyclic rate.

It is an object of the present invention to provide for use in a 20 mm. gun or cannon, for example, an ammunition feeder which adds little to the weight of the gun and which will deliver cartridges effectively at a very high rate, for example, fourteen hundred rounds per minute, to the gun.

With the above object in view there is provided in an automatic gun, a receiver, a barrel having a bore, a carrier for cartridges assembled in a belt, and means powered by gases from said bore for positively moving said carrier step-by-step to deliver cartridges successively to a ramming position in the receiver.

In the illustrative gun the barrel and the receiver are secured together and are slidingly mounted in a cradle for movement in recoil against the action of a recuperator. The gun is disclosed in detail in an application for United States Letters Patent Serial No. 775,844, filed September 24, 1947, now Patent No. 2,928,100, in my name and comprises a bolt assembly consisting of a slider, a bolt and a wedge which are slidingly interlocked and are moved in recoil in the receiver, until stopped by a reaction unit, after the bolt has been moved from an elevated locked battery position to a lowered unlocked position by a gas operated piston forced against the wedge and actuating the bolt through its interlocked connection with the wedge. Cartridges in the belt are delivered successively to a ramming position in the receiver by the carrier which has the form of a "star wheel," the bolt, portions of which serve as a rammer during movement of the bolt in counter-recoil, cooperating with a deflecting face of the carrier and with a belt clip, which holds the cartridge in ramming position in the receiver, to cause the cartridge to be chambered.

The carrier is indexed to feed cartridges successively into ramming position, by mechanism comprising a piston which is reciprocable in a cylinder and is powered by gases delivered through a passage from a bore of the barrel of the gun into a chamber formed by the cylinder and the piston. The construction and arrangement of the feed mechanism are such that gases tapped from the bore and delivered to the above mentioned chamber move the piston in one direction to a retracted position without effecting movement of the carrier, then held stationary by a detent, said gases thereafter moving the piston in an opposite direction to index the carrier and thus to move the next cartridge in the belt, when the slider and the bolt have been moved sufficiently in recoil, to its ramming position in the receiver.

The ammunition feeder adds little weight to the gun, is simple in construction, and is positive and effective in its operation. By causing the piston to be moved through a complete cycle by each charge of gas tapped from the barrel bore, it will be apparent that the ammunition feeder which is actuated through said piston will at all times be moved in proper timed relation with the gun.

Figure 10:
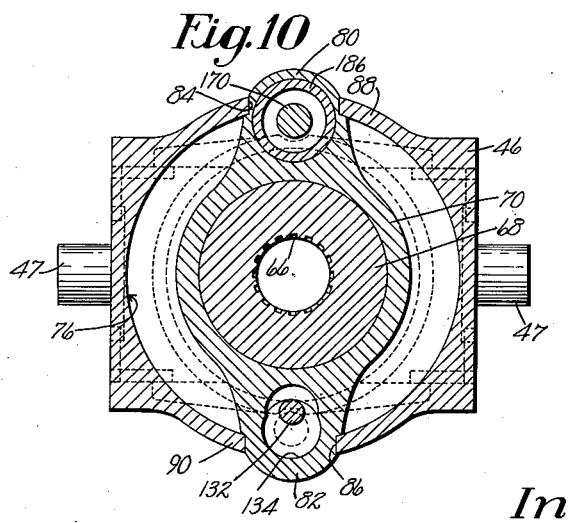

The various features of the invention will be understood and appreciated from the following detail description read in connection with the accompanying drawings in which:

Fig. 1 is a plan view of a portion of the illustrative gun,

Fig. 2 is a vertical section on line II—II of Fig 1, a bolt assembly of the gun being shown in battery position, Fig. 3 is a view similar to Fig. 2, the bolt assembly being shown in recoil position, Fig. 4 is a perspective view of the bolt assembly of the gun and a bolt lock which is secured to and forms, in effect, part of a receiver of the gun, Fig. 5 is an exploded view of the bolt assembly illustrated in Fig. 4, Fig. 6 is a perspective view showing the bolt assembly in battery position, a bolt of said assembly being locked against recoil in front of portions of the bolt lock, parts of which are shown in phantom lines, Fig. 7 is a section on line VII—VII of Fig. 1 illustrating an ammunition feeder of the gun in the process of delivering a cartridge to a ramming position in a receiver of the gun and also showing electric ignition means associated with a slider forming part of the bolt assembly, Fig. 8 is a section of line VIII—VIII of Fig. 2 showing a reaction unit of the gun, Figs. 9 and 10 are sections on lines IX—IX, X—X respectively of Fig. 2, Fig. 11 is a perspective view partly in section on line XI—XI of Fig. 2 showing the forward end of the bolt and a feed box of the gun, Fig. 12 shows in perspective portions of the feed box and a rotary carrier or "star wheel" forming part of the ammunition feeder, Fig. 13 is a perspective view of a gas operated piston forming part of the ammunition feeder, Fig. 13a is an enlarged partial section on line XIIIa—XIIIa of Fig. 1, Figs. 14, 15, 16 and 17 are diagrammatic views illustrating four different stages in the cycle of operation of the gas operated piston, Fig. 18 is a sectional view on an enlarged scale illustrating in detail the construction of a cylinder in which the gas operated piston is reciprocated, Figs. 19 and 20 are sections on lines XIX—XIX, XX—XX respectively of Fig. 3, and Figs. 21 and 22 are perspective views of portions of the cartridge belt, clips and links of which are shown in detail.

The illustrative ammunition feeder comprises a feed box 40 provided at its forward end with a pair of lugs 42 (Figs. 9 and 11) constructed and arranged to fit in channels 44 (Fig. 11) in a cradle 46 having trunnions 47 which may be mounted upon a rotatable pedestal (not shown) or may be secured to a turret (not shown) mounted for movement in azimuth and elevation in an airplane. In order to secure the feed box 40 in its proper position on the cradle 46, the lugs 42 of the feed box 40 are engaged in the channels 44 of the cradle, bores in rearwardly extending arms 48 of the feed box then being brought into register with bores of upstanding bosses 50 of the cradle, preparatory to securing the rear end of the feed box to said cradle by a pin 52. Since the gun of which the ammunition feeder forms a part is described in detail in said application Serial No. 775,844, now Patent No. 2,928,100, only such parts of the gun as are necessary in describing said feeder will be described herein.

Rotatably mounted in the feed box 40 is a carrier, sprocket or "star wheel" 54 provided with elongated pockets 56 (Figs. 1, 2, 3, 7, 8, and 12) constructed and arranged to receive 20 mm. cartridges 58 (Figs. 1, 2, 3 and 21) which are assembled in a belt 60 (Figs. 1, 7 and 21) and are fed downward through a chute 62 (Figs. 1 and 7) secured by screw and nut assemblies 64 (Fig. 7) to the cradle 46. As will be explained later, the cartridges 58 in the belt 60 are moved successively, by mechanism actuated by expanding gases tapped from a bore 66 (Figs. 2, 3, 9 and 10) of a barrel 68 of the gun, to a ramming position, shown in Fig. 3 and corresponding to the dash line position shown in Fig. 7, in a receiver 70 of the gun preparatory to being chambered. The portion of the belt 60 from which the cartridges 58 have been extracted is forced upward through a chute 62a (Figs. 1 and 7), secured by screw and nut assemblies 64a to the cradle 40, and then disintegrates as will be explained later.

The barrel 68 is threaded into the receiver 70 and is secured thereto in its proper position by a screw 72 (Figs. 2 and 3), said barrel being slidingly mounted in a recuperator 74 (Figs. 1, 2 and 3) (partly shown) which is secured to the cradle 46 by mechanism illustrated in detail in said application Serial No. 775,844, now Patent No. 2,928,100. The receiver 70 is mounted for longitudinal sliding movement in the cradle 46, the inner face 76 (Figs. 2, 3 and 7 to 11 inclusive) of which is cylindrical and is constructed and arranged to be engaged by cylindrical outside faces 78 (Figs. 2, 3, 8, 11 and 18) of the receiver, which is also provided with upper and lower projections 80 (Figs. 1, 2, 3, 10, 13a, 18, 19 and 20), 82 (Figs. 3, 7, 8, 9 and 10) slidingly fitting in slots 84 (Figs. 1 and 10), 86 (Fig. 10) formed between upwardly and downwardly extending pairs of flanges 88 (Figs. 1 and 10), 90 (Fig. 10) respectively of the cradle. When the gun is fired, the receiver 70, together with the barrel 68 and other parts carried by and/or secured to the receiver, moves in recoil about ¼" against the action of the recuperator 74 and then activated by the recuperator moves back to forward battery position. When the gun is in battery position, as illustrated in Fig. 2, a bolt 92 (Figs. 2 to 6 inclusive, 9 and 11) of the gun is in its raised position with relation to a slider 94 with which the bolt is slidingly interlocked or coupled for longitudinal movement, faces 96 (Figs. 4, 5 and 6) of the bolt at such time being in engagement with the front faces of lugs 100 (Figs. 3, 4 and 6) and rail portions 102 of bolt locks 104 (Figs. 3, 4, 6 and 8) which are secured by screws 106 (Figs. 3 and 7) to, and may be considered as part of the receiver 70.

As disclosed in detail in said application Serial No. 775,844, now Patent No. 2,928,100, the bolt 92 is provided with a T-shaped tongue 108 (Figs. 4, 5 and 6) which is slidable in a T-shaped guideway 110 at the forward end of the slider 94, said bolt 92 having at its lower end an inclined T-shaped tongue 112 (Figs. 5 and 11) fitting in an inclined T-shaped guideway 114 (Figs. 2, 3, 5 and 11) of a wedge 116 longitudinally slidable in ways 118 (Figs. 4, 5, 7 and 8) of the slider 94. The wedge 116 is constantly urged forward to move the bolt 92 to its raised locked position, by a spring 120, the forward and rear ends of which are housed in recesses 122 (Figs. 2, 3 and 7), 124 (Figs. 2, 3, 5 and 6) of the slider 94 and the wedge 116 respectively.

The wedge 116 is moved rearward to move the bolt 92 downward until channels 126 (Figs. 4, 5 and 6) of the bolt are in alinement with lateral channels 128 of the slider 94 and with rails 130 (Figs. 2, 3, 7 and 8) of the receiver 70 and the rail portions 102 (Figs. 3, 4 and 6) of the bolt locks 104, by a gas operated piston 132 (Figs. 2, 3, 9, 10 and 11) which is slidable in a cylinder 134 formed in the lower projection 82 of the receiver 70. Extending between the cylinder 134 and the bore 66 of the barrel 68 is a passage 136 (Figs. 2 and 3) for conducting expanding gases in said bore to the cylinder 134, the arrangement being such that when the barrel and the receiver 70 are approximately at the end of their movement in recoil, pressure of gases in the cylinder is sufficient to move the wedge 116 rearward causing the bolt 92 to be moved from its raised battery position shown in Fig. 2 to its lowered unlocked forward position. Continued rearward movement of the piston 132, after the unlocking of the bolt 92 causes the bolt, together with the slider 94 and the wedge 116, to move in recoil in the receiver 70 until stopped by a reaction unit 140 (Figs. 2, 3 and 8), the bolt assembly, which comprises the bolt, the slider and the wedge then being in its fully recoiled position shown in Fig. 3. During recoil movement of the bolt assembly a case 142 of the spent cartridge is withdrawn from a cartridge chamber 144 of the bore 66 of the barrel 68 by extracting lugs 146 (Figs. 2 to 6 inclusive, 9 and 11) of the bolt 92 and is deflected downward by cam surfaces 148 (Fig. 3) of the rails 130 through an opening 150 (Figs. 2, 3 and 11) formed in the bottom of the receiver 70 and the cradle 46.

Front and rear portions of the cartridge receiving pockets 56 of the sprocket 54 are interrupted by notches 152 (Figs. 1, 2, 3 and 12) and recesses 154 which are constructed and arranged to accommodate clips 156 of the belt 60 to permit the cartridges 58 in the belt to fit properly in said pockets as they are moved successively into ramming position. As will be hereinafter explained, the belt 60 is so constructed and arranged that the cartridges 58 may be moved around curves of short radii and may "fan" to a considerable degree. When the leading cartridge 58 in the belt 60 is in its ramming position shown in Fig. 3 (shown by dash lines in Fig. 7) in the receiver 70, faces 158 (Figs. 3, 4, 5, 6 and 11) of the extracting lugs 146 of the bolt 92, during movement of the bolt, together with the slider 94 and the wedge 116, in counter-recoil, engage the rear end of the cartridge 58 and force said cartridge forward. As the cartridge 58 in ramming position and gripped by its associated clip 156 is moved forward, its front end is deflected downward by the projectile engaging or deflecting portion of the pocket 56 with the result that said cartridge is stripped from the clip. During such stripping action the cartridge 58 enters the cartridge chamber 144 and is restrained against lateral displacement by said clip 156. After the cartridge 58 leaves the clip 156 its rear end tilts momentarily below the extracting lugs 146 of the bolt with the result that the rear end of the cartridge slides off the faces 158 of the bolt 92 and is engaged by a front face 160 of the bolt. As the cartridge 58 continues to be moved forward by the bolt 92 into the cartridge chamber 144 its rim 162 (Figs. 1 and 3) rises so as to enter a T-shaped groove 164 (Figs. 3 to 6 inclusive and 11) formed in the bolt behind the extracting lugs 146. When the bolt 92 engages the barrel 68 its forward movement ceases. Continued forward movement of the wedge 116 under its own momentum and the action of the spring 120 raises the bolt 92 to its locked battery position shown in Fig. 2.

The sprocket 54 is actuated by hereinafter described mechanism operated by gases tapped from the bore 66 of the barrel 68, the construction and arrangement being such that the leading cartridge 58 in the belt 60 is forced against the top of the slider 94 and the bolt 92 as illustrated in Fig. 7 and as soon as the bolt has been moved in recoil to a position rearward of such cartridge, said cartridge is advanced by said mechanism to its ramming position shown in Fig. 3 (dash line position shown in Fig. 7). The sprocket 54 is provided with a longitudinal recess 166 (Figs. 2, 3, 7 and 12) which houses a recoil spring 168, the forward end of which encircles the rear end of a piston 170 and engages a collar 172 (Figs. 2 and 3) secured to said piston. The piston 170 has a cylindrical face 174 (Figs. 2, 3, 9 and 11) upon which is mounted a worm 176, a circumferentially grooved portion 178 (Figs. 2, 3 and 13) of the piston serving as a gas seal being slidable along a bore 180 (Figs. 2, 13, 18 and 19) of the upper projection 80 of the receiver 70. The piston 170 has just forward of its circumferentially grooved portion 178, a longitudinally fluted portion 182 (Figs. 2, 3, 13, 13a and 19) constructed and arranged to slide along a splined portion 184 (Fig. 18) of a sleeve 186 which has an intermediate cylindrical portion 188 and an adjacent forward cylindrical portion 190 having a diameter slightly greater than that of the intermediate portion. The sleeve 186 may be considered as constituting part of a cylinder which is formed by the projection 80 of the receiver 70 and in which the piston 170 is mounted for reciprocation. The intermediate and forward cylindrical portions 188, 190 of the cylinder may be referred to as longitudinal bores of smaller and larger cross-sectional areas respectively.

It will be noted that the outside diameter of the fluted portion 182 (Figs. 13 and 19) of the piston 170 is somewhat less than that of the intermediate cylindrical portion 188 of the sleeve 186, a shoulder 192 (Fig. 18) being formed at the rear end of said intermediate portion. The piston 170 has reduced rod portions 194, 196 spaced by a flange 198 which is formed integral with the piston and has a diameter approximately the same as that of the intermediate cylindrical portion 188 of the sleeve 186. The rod portion 196 of the piston 170 is mounted for sliding movement in a plug 200 which serves as a bearing for the piston 170 and fits in the forward end of the sleeve 186. The plug 200 is inserted in the forward cylindrical portion 190 of the sleeve 186 at the time the barrel 68 is screwed into the receiver 70, said plug being held in place by a ring 202 (Figs. 1, 2 and 3) which is forced against the forward end of the plug by a shoulder 204 of the barrel. When the piston 170 is reciprocated to a position in which its flange 198 is in the intermediate cylindrical portion 188 of the sleeve 186, expanding gases admitted to said cylinder, which may be referred to as a gas receiving chamber, cause the piston to move forward, that is, toward the front end of the gun to its retracted position shown in Figs. 2 and 14, because of the differential pressure area between a front face 206 (Figs. 13 and 19) of the fluted portion 182 of the piston 170 and a rear face 208 of the flange 198 of the piston.

It will be noted that the longitudinally fluted portion 182 of the piston 170 extends rearward to the circumferentially grooved portion 178 of the piston and that there are slight clearances 209 (Fig. 19) between opposing cylindrical portions of the splined portion 184 of the sleeve 186 and the longitudinally fluted portion 182 of the piston. It will be apparent that high-pressure gases admitted to the intermediate cylindrical portion or chamber 188 act against the front face 206 of the fluted portion 182 of the piston and against rear shoulders 211 (Fig. 13) of said fluted portion as well as against outwardly curved faces 213 at the forward end of the circumferentially grooved portion 178 of the piston 170. With such a construction the effective area against which gas pressure in the chamber 188 acts to move the piston 170 rearward is approximately equal to the cross-sectional area of the circumferentially grooved portion 178 of the piston minus the cross-sectional area of the reduced rod portion 194 of the piston, such area being indicated by stippling as shown in Figs. 19 and 20. In illustrating the operation of the gas operated piston 170 the face 206 of the piston shown in Figs. 14 to 19 inclusive will be assumed to have the same pressure area as that shown in stippling in Figs. 19 and 20.

Formed in the sleeve 186, of the receiver 70, the barrel 68 and a silver heat dissipating plug 210 (Figs. 2, 3, 13a and 18) fitting in a recess 212 of the barrel, are registering openings forming a gas passage 214 for conducting expanding gases from the bore 66 of the barrel 68 to the intermediate cylindrical portion or chamber 188 of the sleeve 186. When the piston 170 has been moved to a position in which its flange 198 is in the forward cylindrical portion or bore 190 of the sleeve 186 as shown in Figs. 2 and 14 any gases passing through the passage 214 will flow directly around the flange 198 and operate against a front face 216 of said flange causing unbalanced pressure between the faces 206, 208 and 216 of the piston, with the result that the piston will be moved rearward of the gun from its then retracted position.

The worm 176 (Figs. 2, 3, 9 and 11), which as above explained, is mounted upon the cylindrical face 174 of the piston 170, is in meshing engagement with a nut 218 (Figs. 2, 3, 9 and 12) which is splined into the sprocket 54 and is held in its operative position in said sprocket by a retainer 220 (Figs. 9 and 11). The nut 218 may be regarded as constituting part of the sprocket 54. The retainer 220 comprises a pair of arms 222 (Figs. 1, 2, 3, 9 and 11) pivoted upon a fulcrum pin 224 carried by the feed box 40 and held in their locking positions in which their lower ends are in engagement with each other, by a spring 226. The piston 170 is also provided with four recesses 228 (Figs. 2 and 3) which are constructed and arranged to receive studs 230 (Figs. 2, 3 and 12) at the forward end of the worm 176 when the piston has been moved to its rearward position shown in Fig. 3 with relation to said worm.

When the first cartridge of a burst is fired, the piston 170 is in its forwardmost position in the gun illustrated in Figs. 2 and 14, said piston having been moved to such position by the spring 168 (Figs. 2, 3 and 7) after the cessation of the previous burst, the flange 198 of the piston 170 at such time being positioned in the forward cylindrical portion or bore 190 of the sleeve 186. When the gun is first fired, gases escaping through the passage 214 from the barrel bore 66 enter the intermediate cylindrical portion or bore 188 of the sleeve 186 and pass around the flange 198 as indicated in Fig. 14 into the forward cylindrical portion or bore 190 of the sleeve with the result that unbalanced pressure on the faces 206, 208 and 216 of the piston 170 causes said piston to move rearward of the gun. When the leading cartridge in the belt 60 is in its ramming position in the receiver 70 a spring actuated detent 232 (Figs. 1 and 9) slidable in a guideway 234 (Fig. 9) of the feed box 40 is in engagement with one of four equally spaced notches 236 (Figs. 9 and 12) in the sprocket 54, the construction and arrangement being such that when the sprocket has been rotated clockwise as viewed in Fig. 7 sufficiently to bring the leading cartridge into ramming position the detent enters one of the notches in the sprocket.

As the piston 170 starts to move rearward of the gun from its retracted position shown in Figs. 2 and 14 its recesses 228 (Figs. 2 and 3) are moved into locking engagement with the studs 230 of the worm 176, continued rearward movement of the piston causing said worm to move from its forward position shown in Fig. 2 in which a flange 237 (Figs. 3 and 12) thereof engages the nut 218 toward its rearward position in which said flange engages a shoulder 238 (Figs. 2 and 3) formed in the longitudinal recess 166 of the sprocket 54, thereby causing said sprocket to rotate clockwise as viewed in Fig. 7 to move the leading cartridge 58 in the belt 60 against the top surfaces of the slider 94 and the bolt 92 which at that time have not been moved to their recoil positions in the receiver. As soon as the bolt 92 has been moved to a recoil position rearward of the leading cartridge 58 pressing against it said cartridge is moved into ramming position shown in dash lines Fig. 7 by the continued movement rearward of the gun of the piston 170, such movement being limited by the engagement of the flange 237 of the worm 176 with the shoulder 238 of the sprocket 54.

The pitch of the threads of the worm 176 and the nut 218 is such that when the worm is moved from its retracted position illustrated in Fig. 2 to its position illustrated in Fig. 3 the sprocket 54 is moved one quarter of a revolution, permitting the detent 232 to engage in a succeeding notch 236 of the sprocket, the leading cartridge 58 then being in its ramming position in the receiver 70. As the bolt assembly moves forward the front faces 158 of the extracting lugs 146 of the bolt 92, which faces may be referred to as ramming faces of the bolt, engage the rear end of the cartridge causing said cartridge to be chambered in the barrel 68 of the gun as above explained and as more fully explained in said application Serial No. 775,844.

The gun is electrically fired by mechanism described in said application Serial No. 775,844 as soon as the bolt 92 has been locked in its battery position shown in Fig. 2. At this time the spring 168 will have a tendency to move the piston 170 forward of the gun toward its retracted position but the cyclic rate of the gun is so high that the spring has little time to act before the expanding gases from the bore 66, due to firing the chambered cartridge, enter the intermediate cylindrical portion or bore 188 of the sleeve 186 causing the piston, which at that time is approximately in the position shown in Fig. 17, because of unbalanced pressure against the faces 206 and 208 of the piston, to move forward. When the piston 170 is at the rear end of its stroke as illustrated in Figs. 3 and 16 an exhaust passage 240 (Figs. 1, 2, 3 and 14 to 17 inclusive) in the piston connects the forward cylindrical portion or bore 190 of the sleeve 186 with the atmosphere, thereby permitting the escape of gases from said cylindrical portion before movement of the piston is reversed. The piston 170 under the action of expanding gases from the bore 66 of the barrel 68 (Fig. 17) moves forward with relation to the worm 176 and thus moves the recesses 228 (Figs. 2 and 3) of the piston away from the studs 230 (Figs. 2, 3 and 12) on the worm until the collar 172 of the piston engages the rear end of the worm, whereupon the worm rotates idly upon the cylindrical face 174 (Figs. 2, 3, 9 and 11) of the piston but slides forward with the piston as said piston moves to its retracted position shown in Fig. 2. When the flange 237 (Figs. 3 and 12) of the worm 176 engages the nut 218, thereby limiting movement of the piston 170 forward of the gun, the flange 198 of said piston is in the forward cylindrical portion 190 of the sleeve 186 as best illustrated in Fig. 14, the gases previously in the intermediate cylindrical portion 188 of the sleeve passing around and in front of the flange with the result that movement of the piston is reversed. After the piston 170 has been coupled to the worm 176 by the interlocking of the studs 230 of the worm with the recesses 228 of the piston, which studs and recesses may be said to constitute a clutch, the worm is caused to move rearward without being rotated and accordingly rotates the sprocket 54 clockwise as viewed in Fig. 7 until the leading cartridge 58 engages the upper surfaces of the slider 94 and the bolt 92 as above explained. When the bolt assembly has moved in recoil sufficiently to permit further rearward movement of the piston 170, the expanding gases acting through the above described mechanism move the sprocket 54 to its next index position, the cartridge then being in its ramming position. When the last cartridge of a "burst" has been fired the piston 170 is forced forward by the spring 168, the spring first moving the piston relatively to the worm 176 to release the worm for rotation upon the piston and then causing the piston to be moved to its forward position shown in Fig. 14.

The clips 156 (Figs. 7, 21, 22) which grip the cartridges 58 and are joined together by couplings 242, are constructed and arranged firmly to clasp the cartridges irrespective of the strains in the belt during its operation. Each clip 156 comprises clasping portions 244 which encircle approximately 220° of the case 142 of the associated cartridge 58 and are joined at their circumferential central parts to lateral portions of arched median plates 246 of the clip by neck portions 248. The end portions of the plates 246 are reduced in width to extend through slots 250 in associated couplings 242, the outer end of the trailing portion of the plate 246 of each of the clips having outwardly swaged portions 252 for insuring that each of the clips shall not be separated from the coupling behind it. The leading end of the arched plate 246 of each of the clips 156 is not swaged but is so constructed and arranged that each of the couplings 242 becomes disengaged from a following plate 246 as such coupling rides around a curved portion 251 of the chute 62a, as illustrated in Fig. 7. The belt 60 may thus be described as disintegrating. The cartridge clasping portions 244 of the clips 158 may be defined as being offset laterally from the opposite lateral margins respectively of an associated plate 246 and as being arranged at one side of the plate.

The construction and arrangement of the clips 156 and the couplings 242 is such that "fanning" of the clips and accordingly the cartridges in said clips is permitted, and that adjacent clips can be effectively folded back against each other to enable the cartridges to be fed around sharp curves. Inasmuch as the plates 246 are joined to the clasping portions 244 by neck portions 248 which are located at the lateral margins of the plates and are equidistant from the opposite ends of mouth portions or cartridge receiving openings 254 of said clasps, strains in the plates 246 in the operation of the belt will not materially affect the gripping of the cartridges by the clasping portions 244 of the clips.

Having thus described my invention, what I claim as new and desire to secure by Letters Patent of the United States is:

1. In an automatic gun, a receiver, a feeder for delivering cartridges successively to said receiver, a cylinder, means for conducting gases to said cylinder, a piston which is movable in the cylinder in one direction to a retracted position by the action of expanding gases operating against one or more faces of the piston, said piston also being constructed and arranged for movement in an opposite direction in said cylinder by the action of the same gases acting against the above and another face of said piston, and means for casuing the feeder to be disconnected from the piston during movement of the piston in said one direction and for causing the feeder to be operatively connected to the piston during movement of the piston in said opposite direction.

2. In an automatic gun, a receiver, a rotatable carrier for delivering cartridges successively to said receiver, a nut secured to the carrier, a gas operated piston mounted for reciprocation, a spring for constantly urging the piston in one direction to a retracted position, a worm which is mounted for rotation upon the piston and is in meshing relation with the nut and in which the piston is reciprocable, and means for securing the worm against rotation upon the piston and for causing reciprocation of the worm in a direction opposite to said one direction together with said piston to effect rotation of the nut and accordingly rotation of the carrier, said spring being constructed and arranged to move the piston with relation to the worm in said one direction to release the worm for rotation on the piston and then to cause reciprocation of the piston and the worm in said one direction until said piston has been moved to its retracted position.

3. In an automatic gun, a receiver, a rotatable carrier for delivering cartridges successively to the receiver, a cylinder having adjacent longitudinal bores which are of smaller and larger cross-sectional areas, means comprising a piston for positively operating the carrier in one direction, said piston having a flange constructed and arranged to fit slidingly in the longitudinal bore of smaller cross-sectional area and having pressure faces at its opposite ends, and means for admitting high pressure gases into the longitudinal bore of smaller cross-sectional area to cause pressure to be exerted against one of said pressure faces of the flange thereby moving the piston in one direction to a retracted position without effecting movement of the carrier, said flange of the piston being constructed and arranged upon its movement in said one direction to enter said longitudinal bore of larger cross-sectional area of the cylinder to permit said gases to flow around said flange into the longitudinal bore of larger cross-sectional area of the cylinder and into engagement with the other of said pressure faces of the flange thereby causing the piston to move in a direction opposite to said one direction to effect positive feeding movement of the carrier.

4. In an automatic gun, a receiver, a rotatable carrier for cartridges assembled in a belt, means for rotating said carrier in one direction, step-by-step, to an indexed position to deliver said cartridges in said belt successively to a ramming position in the receiver, a detent for preventing movement of the carrier opposite to said one direction when the carrier is in its indexed position, and a cylinder, said means comprising a reciprocating piston which is movable in said cylinder and forms with the cylinder a chamber constructed and arranged to receive high pressure gases, said cylinder, said piston and said means being so constructed and arranged that a charge of gas admitted to the chamber causes the piston to move in one direction to a retracted position without effecting movement of the carrier and then in a direction opposite to said one direction to cause the carrier to deliver a leading cartridge in said belt to a ramming position in the receiver.

5. In an automatic gun, a receiver, a rotary carrier constructed and arranged to deliver cartridges assembled in a belt successively to the receiver, said carrier having a helically threaded portion, a helically threaded worm in meshing engagement with said helically threaded portion of the carrier, a reciprocatory piston, and a clutch which is formed partly by said worm and is engaged for securing said worm against rotation on the piston, when said piston is moved in said one direction, to effect rotation and accordingly cartridge feeding movement of said carrier, said clutch being disengaged when said piston is moved in an opposite direction to enable said worm to rotate freely upon the piston.

6. In an automatic gun, a receiver, a rotatable carrier, means for intermittently operating said carrier to deliver cartridges assembled in a belt successively to a ramming position in the receiver, and a bolt movable in recoil and counter-recoil, said carrier having a plurality of pockets each having a deflecting portion, each of the deflecting portions of said pockets being constructed to cooperate with the bolt during movement of the bolt in counter-recoil to cause an associated cartridge which is in the belt and which is arranged in ramming position in the receiver to be stripped from said belt and to be guided to a battery position in the gun.

7. In an automatic gun provided with a receiver, a barrel having a bore, and a bolt movable in recoil and counter-recoil in the receiver, an automatic feeder comprising a rotatable sprocket for moving cartridges assembled in a belt successively against the bolt and when permitted, upon recoil movement of the bolt, to a ramming position in the receiver, a cylinder, a gas passage connecting the bore of the barrel to the cylinder, a piston which is movable in the cylinder to and from a retracted position, a worm which is geared to the sprocket and through which the piston passes, said worm when in one position on the piston being rotatable upon said piston and when in another position upon the piston being locked against rotation upon the piston, and a spring for constantly urging the piston toward its retracted position, said cylinder, piston and passage being so constructed and arranged that the piston is moved by gases from said passage assisted by the spring to its retracted position during the first part of which movement the worm is disconnected for rotation upon the piston and is thereafter moved as it rotates, together with the piston, said piston thereafter being moved away from its retracted position under continued expansion of the gases causing said worm to be secured to the piston and thereafter to move a predetermined distance therewith to effect a predetermined rotation of the sprocket.

References Cited in the file of this patent

UNITED STATES PATENTS

| | | |
|---|---|---|
| 1,786,207 | Hudson | Dec. 23, 1930 |
| 2,013,765 | Richardson | Sept. 10, 1935 |
| 2,267,501 | Holek | Dec. 23, 1941 |
| 2,353,118 | Schirokauer | July 4, 1944 |
| 2,378,331 | Schirokauer | June 12, 1945 |
| 2,454,251 | Hamilton | Nov. 16, 1948 |

FOREIGN PATENTS

| | | |
|---|---|---|
| 190,057 | Germany | Sept. 27, 1907 |
| 355,767 | Great Britain | Feb. 21, 1930 |